(12) United States Patent
Pandit et al.

(10) Patent No.: US 12,252,229 B2
(45) Date of Patent: Mar. 18, 2025

(54) TRANSPORT REFRIGERATION SYSTEM WITH CO2 SCRUBBER

(71) Applicant: TRANE INTERNATIONAL INC., Davidson, NC (US)

(72) Inventors: Yogesh Pandit, Bengaluru (IN); Zubin Varghese, Bangalore (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 175 days.

(21) Appl. No.: 17/808,268

(22) Filed: Jun. 22, 2022

(65) Prior Publication Data

US 2023/0415879 A1    Dec. 28, 2023

(51) Int. Cl.
  *B63J 2/08* (2006.01)
  *B01D 53/04* (2006.01)
  *B63J 2/12* (2006.01)

(52) U.S. Cl.
  CPC ............... *B63J 2/08* (2013.01); *B01D 53/04* (2013.01); *B63J 2/12* (2013.01); *B01D 2253/204* (2013.01); *B01D 2253/25* (2013.01); *B01D 2257/504* (2013.01)

(58) Field of Classification Search
  CPC ...... B63J 2/08; B01D 53/04; B01D 2253/204; B01D 2257/504; B01D 2253/25
  See application file for complete search history.

(56) References Cited

U.S. PATENT DOCUMENTS

| 9,399,187 B2 | 7/2016 | Meirav et al. |
| 10,646,815 B2 | 5/2020 | Luisman et al. |
| 11,173,444 B2 | 11/2021 | Ferrer Blas et al. |
| 2014/0202183 A1* | 7/2014 | Chadwick ............. A23L 3/3427 96/111 |
| 2021/0252451 A1 | 8/2021 | Zhong et al. |

FOREIGN PATENT DOCUMENTS

| EP | 2734048 B1 | 4/2017 | |
| KR | 20150114724 A | * 10/2015 | |
| WO | WO-2021089629 A1 | * 5/2021 | ............. B01D 53/02 |

* cited by examiner

*Primary Examiner* — Ana M Vazquez
(74) *Attorney, Agent, or Firm* — HSML P.C.

(57) ABSTRACT

A transport refrigeration system (TRS) for an enclosed space of a transport unit that includes a ventilation pathway to direct air to flow from the enclosed space. The TRS includes a refrigerant circuit with an evaporator configured to cool the air, and a $CO_2$ scrubber. The $CO_2$ scrubber includes a metal organic framework (MOF) configured to adsorb $CO_2$ from the air in an adsorption mode and is regenerated with ambient air in a regeneration mode. A transport unit includes an enclosed space for storing produce, a ventilation pathway, and a TRS. A method of conditioning an enclosed space of a transport unit includes operating a TRS in a first mode that cools air from the enclosed space and adsorbs, with a MOF in a $CO_2$ scrubber, $CO_2$ from the air, and operating the TRS in a second mode that regenerates the MOF with ambient air.

20 Claims, 5 Drawing Sheets

TRANSPORT REFRIGERATION SYSTEM WITH CO2 SCRUBBER

FIELD

This disclosure relates generally to transport refrigeration systems. More specifically, this disclosure relates to $CO_2$ scrubbing transport refrigeration systems.

BACKGROUND

Transport units are used to transport cargo across various distances. Transport units can include a transport refrigeration system to condition the transport unit so that the cargo is kept at the desired conditions during transport. Some transport units can be used to transport produce such as fruits and vegetables. The transport refrigeration systems can be used to keep the air within the transport unit at desired temperature/range and/or $CO_2$ concentration/range to keep the produce fresh during transport. In particular, marine transport refrigeration systems used in marine transport units, which are used for transporting cargo by boat (e.g., by water, sea), can be used to keep produce more fresh during longer transport times.

BRIEF SUMMARY

In an embodiment, a transport refrigeration system (TRS) is for a transport unit that includes an enclosed space for storing produce and a ventilation pathway. The TRS includes a refrigerant circuit and an $CO_2$ scrubber. The ventilation pathway has an inlet and an outlet that are each connected to the enclosed space of the transport unit. Air from the enclosed space is configured to enter the ventilation pathway through the inlet and be discharged from the ventilation pathway through the outlet. The refrigerant circuit includes a compressor, a condenser, an expander, and an evaporator that are fluidly connected. The evaporator is disposed in the ventilation pathway and is configured to cool air as it flows through the ventilation pathway. The $CO_2$ scrubber contains a metal organic framework (MOF) configured to adsorb $CO_2$. The $CO_2$ scrubber is disposed in the ventilation pathway downstream of the evaporator. The $CO_2$ scrubber has an adsorption mode and a regeneration mode. In the adsorption mode, the air cooled by the evaporator flows over the MOF and the MOF adsorbs $CO_2$ from the air. In the regeneration mode, ambient air flows over the MOF and the adsorbed $CO_2$ in the MOF is desorbed into the ambient air.

In an embodiment, the transport refrigeration system is configured to decrease a concentration of $CO_2$ in the enclosed space using the $CO_2$ scrubber and without supplying ambient air into the enclosed space.

In an embodiment, the transport refrigeration system is configured to adjust a concentration of oxygen in the enclosed space by supplying ambient air into the enclosed space.

In an embodiment, the $CO_2$ scrubber is configured to maintain a concentration of the $CO_2$ in the enclosed space within a predetermined range.

In an embodiment, the predetermined range is at or above 5% by volume of the $CO_2$ and at or less than 15% by volume of the $CO_2$.

In an embodiment, the predetermined range is based on a type of the produce.

In an embodiment, the transport refrigeration system also includes a heater for heating the ambient air. In the regeneration mode, the heater heats the ambient air prior to flowing over the MOF.

In an embodiment, the MOF has a maximum $CO_2$ saturation. The MOF is configured to desorb at least 90% of the maximum $CO_2$ saturation using the ambient air at a temperature at or below 70° C. degrees.

In an embodiment, the MOF has a $CO_2$ adsorption capacity of at least 25 $cm^3$ STP of $CO_2$/gram of MOF at a $CO_2$ concentration of 15 vol %.

In an embodiment, the $CO_2$ scrubber includes a MOF composition comprising the MOF and 1-10 wt % of binder.

In an embodiment, the binder is polyvinyl butyral.

In an embodiment, the MOF in the $CO_2$ scrubber is in a form of one or more of pellets, a coating on a mesh, and a coating on a solid surface.

In an embodiment, the transport refrigeration system is a marine transport refrigeration system and the transport unit is a marine transport unit.

In an embodiment, a transport unit includes an enclosed space for storing produce and a transport refrigeration system configured to condition the enclosed space. The transport refrigeration system includes a ventilation pathway, a refrigerant circuit, and a $CO_2$ scrubber. The ventilation pathway has an inlet and an outlet each connected to the enclosed space of the transport unit. The ventilation pathway is configured to direct air to flow from the enclosed space into the ventilation pathway via the inlet and out of the ventilation pathway through the outlet. The refrigerant circuit includes a compressor, a condenser, an expander, and an evaporator that are fluidly connected. The evaporator is disposed in the ventilation pathway and is configured to cool the air flowing through the ventilation pathway. The $CO_2$ scrubber is disposed in the ventilation pathway downstream of the evaporator. The $CO_2$ scrubber contains a metal organic framework (MOF) configured to adsorb $CO_2$. The $CO_2$ scrubber is configured to have an adsorption mode and a regeneration mode. The adsorption mode directs the air in the ventilation pathway to flow over the MOF which adsorbs $CO_2$ from the air. The regeneration mode directs ambient air to flow over the MOF. The $CO_2$ adsorbed in the MOF is desorbed into the ambient air.

In an embodiment, the transport refrigeration system is configured to decrease a concentration of $CO_2$ in the enclosed space using the $CO_2$ scrubber and without supplying ambient air into the enclosed space.

In an embodiment, the $CO_2$ scrubber is configured to maintain a concentration of the $CO_2$ in the enclosed space within a predetermined range.

In an embodiment, the MOF has a maximum $CO_2$ saturation, and the MOF is configured to desorb at least 90% of the maximum $CO_2$ saturation using the ambient air at a temperature at or below 70° C. degrees.

In an embodiment, the MOF has a $CO_2$ adsorption capacity of at least 25 $cm^3$ STP of $CO_2$/gram at a $CO_2$ concentration of 15 vol %.

In an embodiment, a method is directed to conditioning an enclosed space of a transport unit. The enclosed space is for storing produce. The method includes operating a transport refrigeration system (TRS) in a first mode and operating the TRS in a second mode. The TRS includes a refrigerant circuit and a $CO_2$ scrubber. The refrigerant circuit includes a compressor, a condenser, an expander, and an evaporator that are fluidly connected. The $CO_2$ scrubber includes a metal organic framework (MOF) configured to adsorb $CO_2$. Operating the TRS in the first mode includes directing air from the enclosed space through a ventilation pathway, cooling the air flowing through the ventilation pathway with the evaporator, and the MOF of the $CO_2$ scrubber absorbing the $CO_2$ from the air cooled by the evaporator. Operating the TRS in the second mode includes directing ambient air through the $CO_2$ scrubber, and regenerating, with the ambient air, the MOF of the $CO_2$ scrubber. The $CO_2$ adsorbed into the MOF in the first mode is released into the ambient air in the second mode.

In an embodiment, the operating in the first mode includes the $CO_2$ scrubber operating in an adsorption mode, and the operating in the second mode includes the $CO_2$ scrubber operating in a regeneration mode.

In an embodiment, the operating of the TRS in the first mode does not add ambient air into the enclosed space.

In an embodiment, the MOF has a $CO_2$ adsorption capacity of at least 25 $cm^3$ STP of $CO_2$/gram at a $CO_2$ concentration of 15 vol %.

BRIEF DESCRIPTION OF THE DRAWINGS

Like reference numbers represent like parts throughout.

DETAILED DESCRIPTION

A transport refrigeration system (TRS) can be used to condition (e.g., cool, heat, remove $CO_2$ from, etc.) an enclosed space of the transport unit. In particular, the transport refrigeration system can be a marine transport refrigeration system (MTRS) that conditions the enclosed space of a marine transport unit. The TRS can be configured to cool the enclosed space so that cargo contained within is at a desired temperature/range. In particular, the TRS can be configured to maintain the $CO_2$ within the enclosed space at or within a specific range when transporting produce such as fruits and vegetables. In some conventional configurations air is added to the enclosed space to lower the $CO_2$ concentration inside the enclosure to be within the desired range for the produce being transported. However, this generally causes a significant increase in the oxygen concentration within the container causing the produce to have increased respiration. This increased respiration causing the produce to ripen more quickly, which is undesirable during transport.

Embodiments described herein are directed to transport refrigeration systems, transport units including a transport refrigeration system, and methods of conditioning an enclosed space of a transport unit that are able to conditioning the enclosed space, which includes cooling and maintaining a desired $CO_2$ concentration, without significantly increasing the oxygen concentration (e.g., without adding oxygen). For example, the transport refrigeration systems and the methods of conditioning are capable of removing $CO_2$ from the enclosed space to maintain the desired $CO_2$ concentration without adding/suppling ambient air into the enclosed space. In some embodiments, the transport refrigeration unit is a marine transport refrigeration system (MTRS) that conditions the enclosed space of a marine transport unit.

Figure 1:
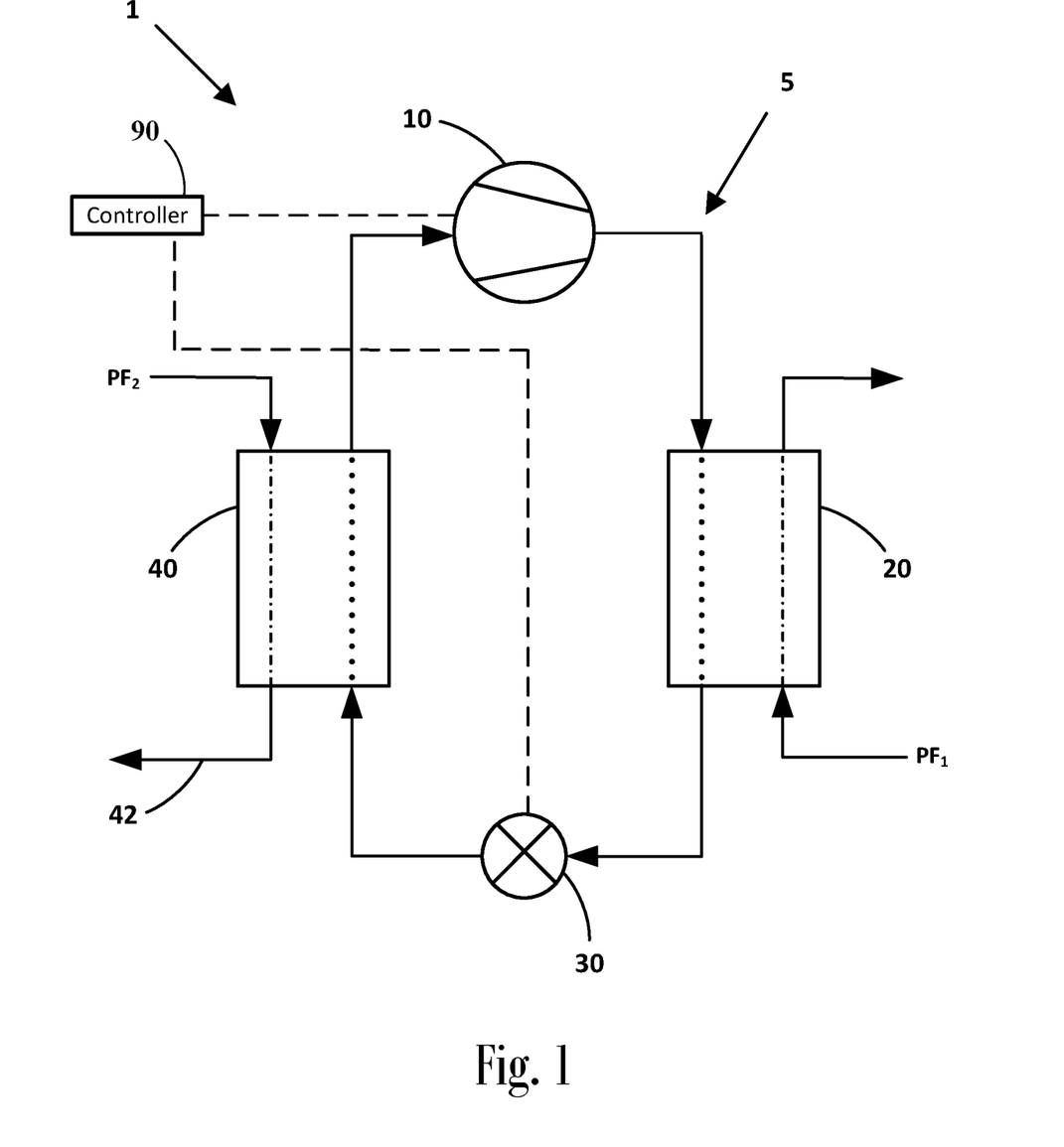
FIG. 1 is a schematic diagram of an embodiment of a refrigerant circuit of a marine transport refrigeration system.

FIG. 1 is a schematic diagram of a refrigeration circuit 5 of a marine transport refrigeration system 1, according to an embodiment. The refrigeration circuit 5 includes a compressor 10, a condenser 20, an expansion device 30, and an evaporator 40. In an embodiment, the refrigeration circuit 5 can be modified to include additional components. For example, the refrigeration circuit 5 in an embodiment can include an economizer heat exchanger, one or more flow control devices, a receiver tank, a dryer, a suction-liquid heat exchanger, or the like.

The components of the refrigeration circuit 5 are fluidly connected. The marine transport refrigeration system 1 can be configured as a cooling system that can be operated in a cooling mode, and/or marine transport refrigeration system can be configured to operate as a heat pump system that can run in a cooling mode and a heating mode.

The refrigeration circuit 5 applies known principles of gas compression and heat transfer. The heat transfer circuit can be configured to heat or cool a process fluid (e.g., water, air, or the like). In an embodiment, the refrigeration circuit 5 may represent a chiller that cools a process fluid such as water or the like. In an embodiment, the refrigeration circuit 5 may represent an air conditioner and/or a heat pump that cools and/or heats a process fluid such as air, water, or the like.

During the operation of the refrigeration circuit 5, a working fluid (e.g., refrigerant, refrigerant mixture, or the like) flows into the compressor 10 from the evaporator 40 in a gaseous state at a relatively lower pressure. The compressor 10 compresses the gas into a high pressure state, which also heats the gas. After being compressed, the relatively higher pressure and higher temperature gas flows from the compressor 10 to the condenser 20. In addition to the working fluid flowing through the condenser 20, a first process fluid $PF_1$ (e.g., ambient air, external water, or the like) also separately flows through the condenser 20. The first process fluid absorbs heat from the working fluid as the first process fluid $PF_1$ flows through the condenser 20, which cools the working fluid as it flows through the condenser. The working fluid condenses to liquid and then flows into the expansion device 30.

The expansion device 30 allows the working fluid to expand, which converts the working fluid to a mixed vapor and liquid state. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in temperature. The relatively lower temperature, vapor/liquid working fluid then flows into the evaporator 40. A second process fluid $PF_2$ (e.g., air, water, or the like) also flows through the evaporator 40. The working fluid absorbs heat from the second process fluid $PF_2$ as it flows through the evaporator 40, which cools the second process fluid $PF_2$ as it flows through the evaporator 40. As the working fluid absorbs heat, the working fluid evaporates to vapor. The working fluid then returns to the compressor 10 from the evaporator 40. The above-described process continues while the refrigerant circuit 5 is operated, for example, in a cooling mode.

The marine transport refrigeration system 1 can also include a controller 90. In an embodiment, the controller 90 may be the controller of the marine transport refrigeration system 1. In an embodiment, the controller 90 may be the controller of the refrigerant circuit 5. For example, the controller 90 may be the controller of the compressor 10. Dotted lines are provided in the Figures to indicate fluid flows through the heat exchangers (e.g., condenser 20, evaporator 40), and should be understood as not specifying a specific path of flow through each heat exchanger. Dashed dotted lines are provided in the Figures to illustrate electronic communications between different features. For example, a dashed dotted line extends from a controller 90 to the compressor 10 as the controller 90 is able to control and operate the compressor 10 (e.g., control a speed of the compressor). For example, a dashed-dotted line extends from the controller 90 to the expansion valve 30 as the controller 90 controls the heater 30. In an embodiment, the controller 90 includes memory (not shown) for storing information and a processor (not shown). The controller 90 in FIG. 1 and described below is described/shown as a single component. However, it should be appreciated that a "controller" as shown in the Figures and described herein may include multiple discrete or interconnected components that include a memory (not shown) and a processor (not shown) in an embodiment.

Figure 2:
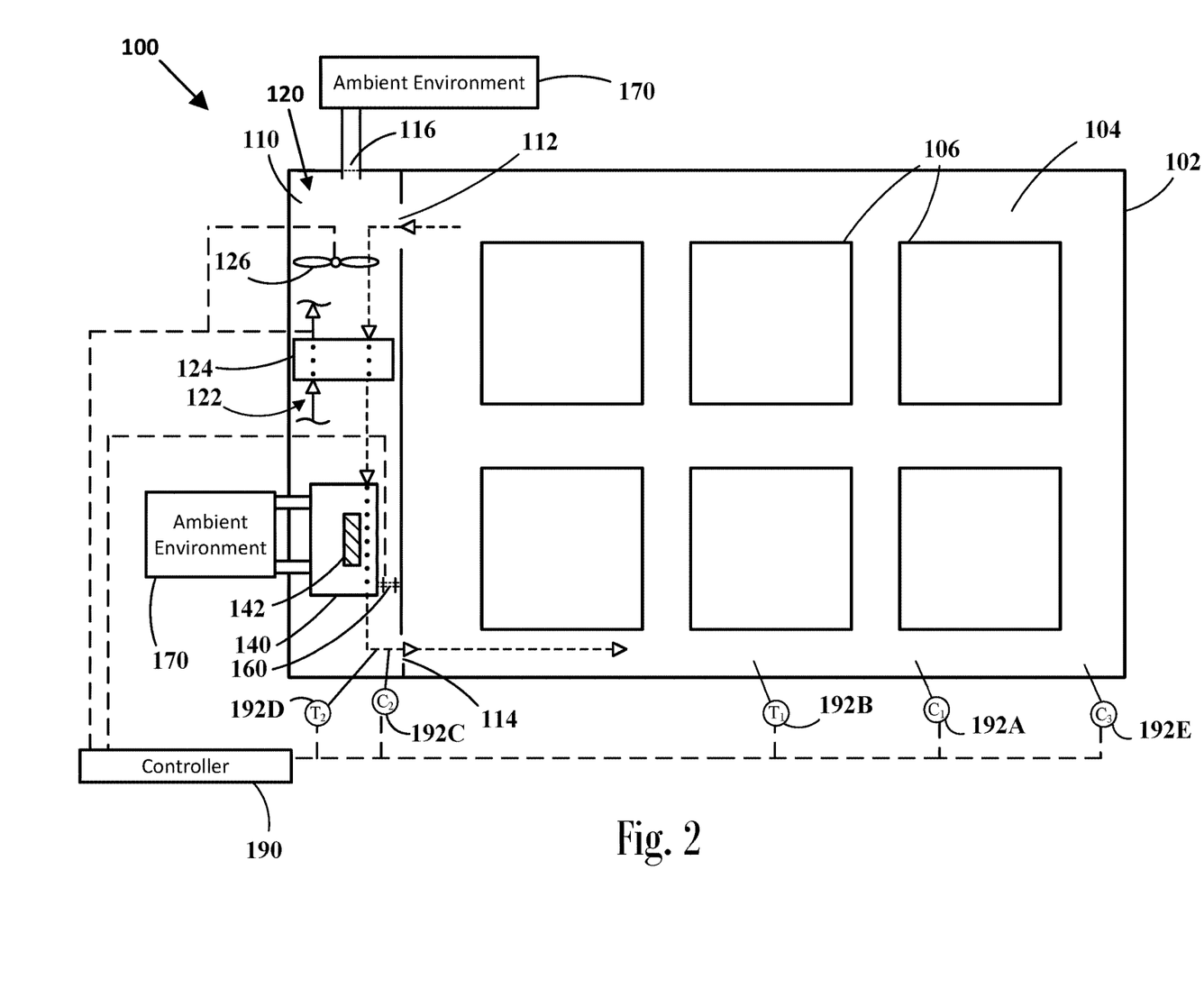
FIG. 2 is a schematic diagram of an embodiment of a marine transport unit including a marine transport refrigeration system.

FIG. 2 illustrates a schematic view of a marine transport unit 100, according to an embodiment. The marine transport unit 100 includes a transport container 102 with an enclosed space 104 for storing cargo 106. The cargo 106 is produce, such as fruits and vegetables, which generate and exhaust $CO_2$ into the enclosed space 104 over time through aerobic respiration. Over time, this respiration increases the $CO_2$ concentration in the air within the enclosed space 104. The marine transport unit 100 also includes a ventilation pathway 110 for directing air to and from the enclosed space 104. For example, air from the enclosed space 104 is cycled through the ventilation pathway 110. This air flowing from the enclosed space 104 into the ventilation pathway 110 may also be referred to as indoor air.

The marine transport unit 100 includes a marine transport refrigeration system 120 configured to condition the enclosed space 104. The ventilation pathway 110 has an inlet 112 and an outlet 114 that are each connected to the enclosed space 104. The air from within the enclosed space 104 is suctioned into the inlet 112, flows through the ventilation pathway 110, and is discharged from the outlet 114 back into the enclosed space 104. For example, the marine transport unit 100 may include one or more fans 126 that direct air to flow through the ventilation pathway 110 and out through the outlet 114 into the enclosed space 104. The marine transport refrigeration system 120 conditions the air as it travels through the ventilation pathway 110, which then conditions the enclosed space when the conditioned air is discharged back into the enclosed space 104.

The marine transport refrigeration system 120 includes a refrigeration circuit 122 and a $CO_2$ scrubber 140. In an embodiment, the refrigeration circuit 122 in FIG. 2 may be the refrigeration circuit 5 in FIG. 1. The refrigeration circuit 122 includes an evaporator 124. The evaporator 124 and the CO2 scrubber 140 are disposed in the ventilation pathway 110. As shown in FIG. 2, The air in the ventilation pathway 110 passes through the evaporator and through the $CO_2$ scrubber 140 as it flows through the ventilation pathway 110. As shown in FIG. 2, the air flows through the evaporator 124 and then through the $CO_2$ scrubber 140 as the air flows through the ventilation pathway 110 from the inlet 112 to the outlet 114.

The evaporator 124 and the $CO_2$ scrubber 140 condition the air as it passes through the ventilation pathway 110. The evaporator 124 cools the air passing through the ventilation pathway 110 (e.g., the air is cooled by the refrigerant in the evaporator 124 as the air and the refrigerant each flow through the evaporator 124 without mixing).

The $CO_2$ scrubber 140 is configured to remove $CO_2$ from the air as it passes through the ventilation pathway 110. The CO2 scrubber 140 includes a metal organic framework ("MOF") 142 (shown in FIGS. 3A and 3B). The CO2 scrubber 140 is configured to have an adsorption mode and a regeneration mode. FIG. 2 shows the $CO_2$ scrubber 140 operating in an adsorption mode. In the adsorption mode, the $CO_2$ scrubber 140 directs the air over the MOF 142 and the MOF 142 adsorbs $CO_2$ from the air. In the regeneration mode, the CO2 scrubber 140 directs ambient air from the ambient environment 170 (e.g., from outside the transport container 102) over the MOF and the adsorbed $CO_2$ in the MOF 142 desorbs into the ambient air. The ambient air containing the desorbed $CO_2$ is then discharged back into the ambient environment 170. The operation of the $CO_2$ scrubber 140 is discussed in more detail below.

The MTRS 120 is configured to be able to condition the enclosed space 104 without adding ambient air. In particular, the MTRS 120 is configured to cool the enclosed space 104 and regulate the $CO_2$ concentration $C_1$ of the enclosed space 104 without adding ambient air. The MTRS 120 is configured to condition the enclosed space 104 so that $CO_2$ concentration $C_1$ of the enclosed space 104 stays within a predetermined range. In an embodiment, the predetermined range for the $CO_2$ concentration is 5-15 vol %. In an embodiment, the predetermined range for the $CO_2$ concentration is 5-10 vol %. In an embodiment, the predetermined range for the $CO_2$ concentration may be predetermined range that is based on the type of produce 106 being transported. In an embodiment, the controller 190 may be configured to determine the type of produce 106 being transported (e.g., through user input, identification on the produce, or the like), and then use a predetermined range that corresponds to the type of produce 106 being transported.

Produce 106 produces $CO_2$ over time through respiration (e.g., aerobic respiration). An increase in the concentration of oxygen within the container can cause the produce to have increased respiration, which results in producing greater amounts of $CO_2$. For example, at a $CO_2$ concentration of 10% by volume: a marine transport container of mangos can produce about 200 liters/hour of $CO_2$, a marine transport container of okra can produce about 425 liters/hour of $CO_2$, and a marine transport container of garlic can produce about 80 liters/hour of $CO_2$. The MTRS 120 is configured to remove $CO_2$ using the MOF 142 such that the $CO_2$ concentration $C_1$ of the enclosed space 104 stays within a predetermined range. For example, the MTRS 120 may be configured to remove $CO_2$ at or about the same rate at which the produce generates $CO_2$. The rate is measured over an extended period of time (e.g., at least 6 hours, at least 12 hours, at least 1 day, etc.).

The MOF 142 is configured to be able to effectively reduce the $CO_2$ in the cooled air discharged from the evaporator 124. In an embodiment, the $CO_2$ scrubber 140 has a maximum $CO_2$ adsorption rate that is equal to or greater than the $CO_2$ production rate of any potential produce 106 to be transported in the marine transport unit 100.

In an embodiment, the marine transport refrigeration system 120 may include a by-pass 160 configured to allow for a portion of the cooled air discharged from the evaporator 124 to by-pass the MOF 142. For example, the by-pass 160 may be an actuatable vent or the like. The by-pass 160 can be used to decrease the amount of cooled air that interacts with the MOF 142. For example, the by-pass 160 may be adjusted (e.g., opened more, closed more, etc.) to adjust the amount of $CO_2$ adsorbed from the cooled air by the $CO_2$ scrubber 140. The by-pass 160 may be adjusted to control the $CO_2$ concentration $C_2$ of the conditioned air discharged into the enclosed space 104. For example, the controller 190 may be configured to adjust the by-pass 160 based on the $CO_2$ concentration $C_1$ within of the enclosed space 104 (e.g., such that the conditioning results in the $CO_2$ concentration $C_1$ being within the desired amount/range). The by-pass 160 in FIG. 2 is shown as be external to the $CO_2$ scrubber 140. However, it should be appreciated that the by-pass 160 in an embodiment may be provided within the $CO_2$ scrubber 140. For example, the by-pass 160 within the $CO_2$ scrubber 140 may be a flow path that does not flow over or contact the MOF 142.

In an embodiment, the $CO_2$ scrubber 140 may be configured to be interchangeable based on the type of produce 106 being transported. For example, a plurality of $CO_2$ scrubbers may be configured for each respectively used in the MTRS 120. Each of the $CO_2$ scrubbers in the plurality has a configuration for adsorbing the amount of $CO_2$ for a respective produce or for a range of produces. For example, a first $CO_2$ scrubber is configured to adsorb $CO_2$ for transporting garlic as the produce 106 in the transport unit 100 (e.g., configured to adsorb at or about the rate at which a load of garlic produces $CO_2$, configured to absorb at or about 80 liters/hour of $CO_2$), a second $CO_2$ scrubber is configured to adsorb $CO_2$ for transporting a load of mangos (e.g., configured to adsorb at or about the rate at which a load of mangos produces $CO_2$, configured to absorb at or about 200 liters/hour of $CO_2$), and a third $CO_2$ scrubber is configured to adsorb $CO_2$ for transporting a load of okra (e.g., configured to adsorb at or about the rate at which a load of okra produces $CO_2$, configured to absorb at or about 425 liters/hour of $CO_2$). For example, each of the $CO_2$ scrubbers in plurality of $CO_2$ scrubbers can have an amount of the MOF that results in the $CO_2$ scrubber adsorbing $CO_2$ at or about the rate of its corresponding type of produce. In an embodiment, a method of conditioning the enclosed space 104 may include determining the type of produce 106 to be transported in the enclosed space 104, and installing the $CO_2$ scrubber 104 from a plurality of $CO_2$ scrubbers that corresponds to the type of produce 106 being transported.

As shown in FIG. 2, the MTRS 100 includes a controller 190. In an embodiment, the controller 190 may be the controller 90 of the MTRS 100. In an embodiment, the controller 190 may be a controller of the refrigerant circuit 122. The controller 190 can be configured to control the operation of the MTRS 100. The controller 190 can be configured to control the MTRS 100 so that the enclosed space 104 is at the desired conditions as described herein (e.g., desired $CO_2$ concentration/range, desired temperature). For example, the controller 190 may control the operation of the refrigeration circuit 122 (e.g., control amount of cooling provided by the evaporator 124), the operation of the $CO_2$ scrubber 140 (e.g., amount of $CO_2$ removal provided by the $CO_2$ scrubber 140), and the operation of the fan 126 (e.g., fan speed). The controller 190 may use sensors (e.g., $CO_2$ concentration sensor 192A, temperature sensor 192B, $CO_2$ concentration sensor 192C, temperature sensor 192D, oxygen sensor 192E, and the like) to detect for conditions of the enclosed space and/or operating conditions of the MTRS 100. For example, the controller 190 may use a $CO_2$ concentration sensor 192A to detect the $CO_2$ concentration $C_1$ of the air in the enclosed space 104, a temperature sensor 192B to detect the temperature $T_1$ of the air in the enclosed space 104, a $CO_2$ concentration sensor 192C to detect the $CO_2$ concentration $C_2$ of the conditioned air being discharged into the enclosed space 104, a temperature sensor 192D to detect the temperature $T_2$ of the conditioned air being discharged into the enclosed space 104, and/or an oxygen concentration sensor 192E to detect the oxygen concentration $C_3$ of the air in the enclosed space 104. The controller 190 can control and adjust the operation MTRS 100 based on the detected the conditions such that the enclosed space 104 is conditioned to be the desired conditions as described herein.

Figure 3A:
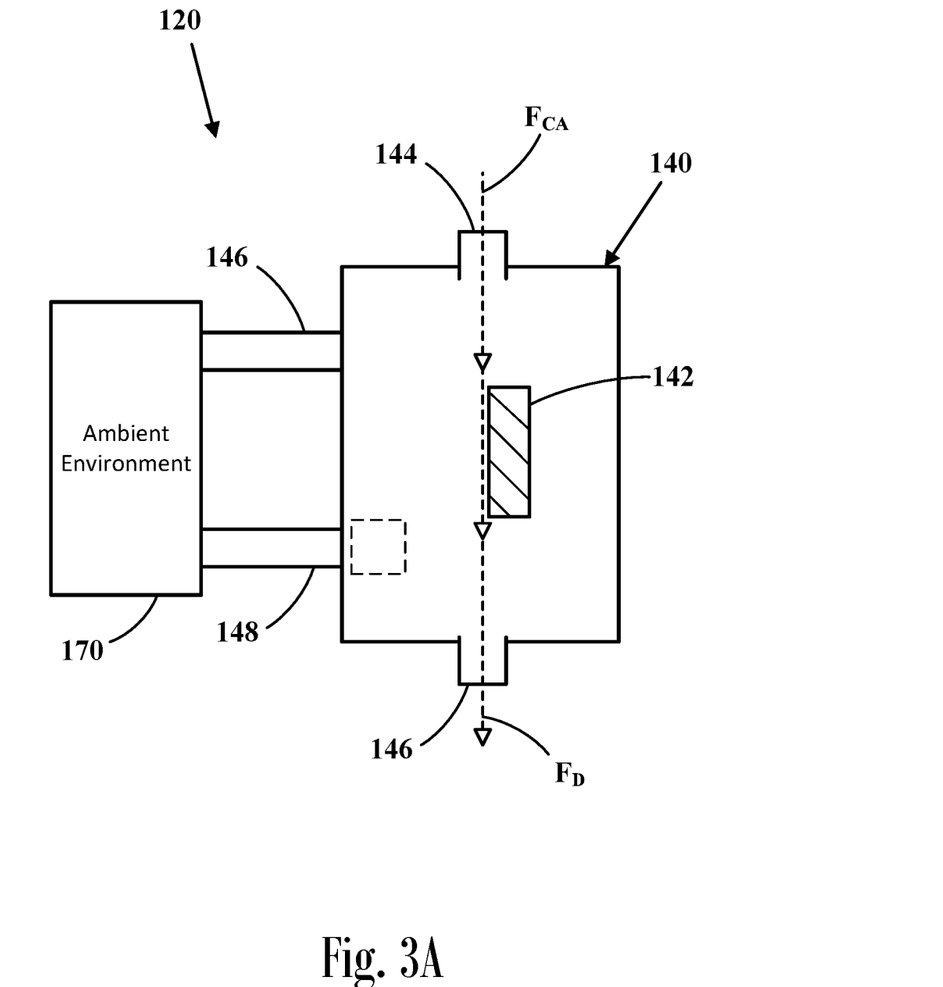
FIG. 3A is a schematic diagram of a $CO_2$ scrubber of the marine transport refrigeration system in FIG. 2 operating in a first mode, according to an embodiment.
Figure 3B:
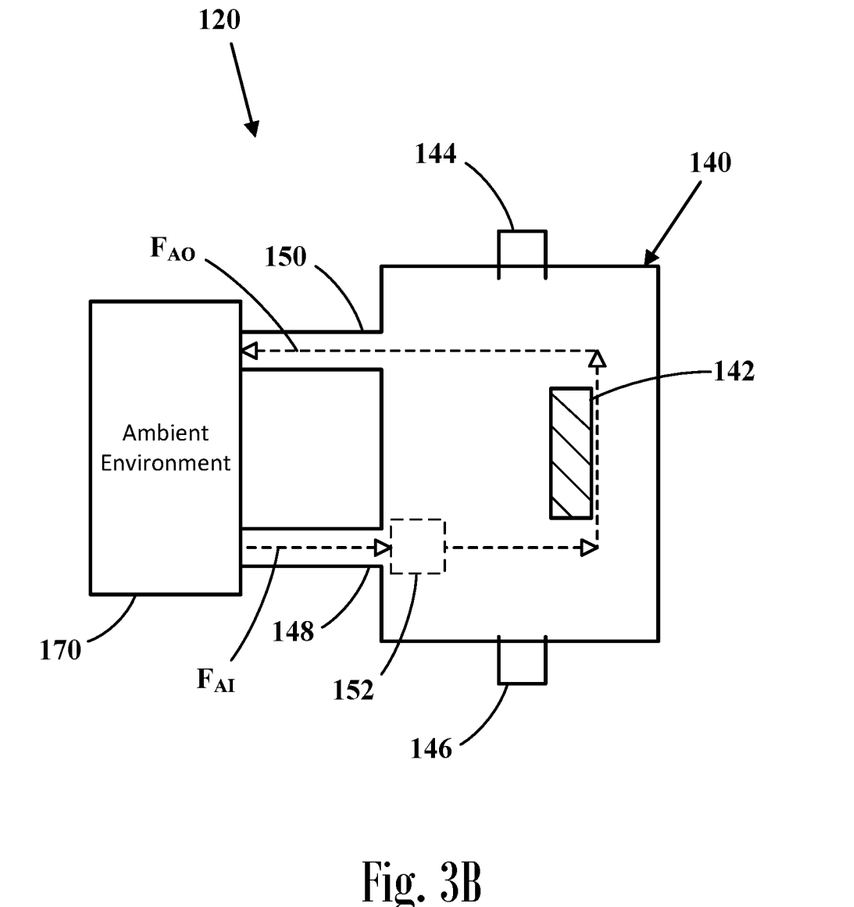
FIG. 3B is a schematic diagram of the $CO_2$ scrubber of the marine transport refrigeration system in FIG. 2 operating in a second mode, according to an embodiment.

FIGS. 3A and 3B is a schematic view of an embodiment of the $CO_2$ scrubber 140 in FIG. 2. FIG. 3A illustrates the CO2 scrubber in a first mode. FIG. 3B illustrates the CO2 scrubber 140 in a second mode. For example, the first mode is an adsorption mode and the second mode is a regeneration mode. In the illustrated embodiment, the CO2 scrubber 140 includes the MOF 142, an indoor air inlet 144, an indoor air outlet 146, an ambient air inlet 148, and an ambient air outlet 150.

As shown in FIG. 3A, the $CO_2$ scrubber 140 in the first mode is configured to have the indoor air inlet 144 open, the indoor air outlet 146 open, the ambient air inlet 148 closed, and the ambient air outlet 150 closed. In the first mode, ambient air from the ambient environment 170 does not flow into and/or through the $CO_2$ scrubber 140. In the first mode, the $CO_2$ scrubber is configured to adsorb/remove $CO_2$ from the cooled air $F_{CA}$ discharged from the evaporator 124 (shown in FIG. 2). The $CO_2$ scrubber 140 receives the cooled air $F_{CA}$ via the indoor air inlet 144. The $CO_2$ scrubber 140 directs the air to flow over the MOF 142. The MOF 142 adsorbing $CO_2$ from the air as the air flows over the MOF 142. The cooled, $CO_2$ scrubbed air $F_D$ is then discharged from $CO_2$ scrubber 140 through the indoor air outlet 146. As discussed above, the cooled, $CO_2$ scrubbed air then flows from the $CO_2$ scrubber 140 and is discharged from the outlet 114 of the ventilation pathway 110 into the enclosed space 104.

When the MOF 142 is at a maximum $CO_2$ adsorption threshold, the $CO_2$ scrubber 140 is configured to switch to the second mode (e.g., illustrated in FIG. 3B) to regenerate the MOF 142. The maximum $CO_2$ adsorption threshold is a predetermined saturation level. The maximum $CO_2$ adsorption threshold may be at or near the full saturation of the MOF 142 (e.g., at or near the $CO_2$ adsorption capacity of the MOF 142). In an embodiment, the maximum $CO_2$ adsorption threshold can be at or above 90% of the $CO_2$ adsorption capacity of the MOF 142. In an embodiment, the maximum $CO_2$ adsorption threshold can be at or above 95% of the $CO_2$ adsorption capacity of the MOF 142.

As shown in FIG. 3B, the $CO_2$ scrubber 140 in the second mode is configured to direct ambient air $F_{AI}$ from the ambient environment 170 to pass over the MOF 142. The $CO_2$ scrubber 140 in the second mode is configured to have the indoor air inlet 144 closed, the indoor air outlet 146 closed, the ambient air inlet 148 open, and the ambient air outlet 150 open. Ambient air $F_{AI}$ flows into the CO2 scrubber 140 through the ambient air inlet 148, passes over the MOF 142, and then discharged through the ambient air outlet 150. The ambient air $F_{AI}$ has a lower content of $CO_2$ (e.g., at or about 0.03 vol % of $CO_2$), such that the adsorbed $CO_2$ in the MOF 142 desorbs into the ambient air as it passes over the MOF 142. The ambient air containing the desorbed $CO_2$ $F_{AO}$ is then discharged from the $CO_2$ scrubber 140 through the ambient air outlet 150. For example, the mixture $F_{AO}$ of ambient and desorbed $CO_2$ is discharged back into the ambient environment 170. The $CO_2$ scrubber 140 is configured to remain in the second mode until the MOF 142 reaches a minimum $CO_2$ adsorption threshold. For example, the minimum $CO_2$ adsorption threshold may be a predetermined threshold. In an embodiment, the minimum $CO_2$ adsorption threshold can be at or below 10% of the $CO_2$ adsorption capacity of the MOF 142. In an embodiment, the minimum $CO_2$ adsorption threshold can be at or below 5% of the $CO_2$ adsorption capacity of the MOF 142.

In an embodiment, the marine transport refrigeration system 120 may include a heater 152 configured to heat the ambient air $F_{AI}$ used by the $CO_2$ scrubber 140 in the second mode. In an embodiment, the heater 152 may be an electric heater, a combustion heater, a heat exchanger, or the like. In one embodiment, the heater 152 may be a heat exchanger configured to heat the ambient air $F_{AI}$ using heat from the refrigerant circuit 122 (shown in FIG. 2). For example, the heater 152 may be a heat exchanger in the refrigerant circuit 122 disposed downstream of the compressor and upstream of the expander (e.g., downstream of the compressor 10 and upstream of the expansion device 30 in the refrigerant circuit 5 in FIG. 1), in which the flowing relatively hotter, compressed refrigerant heats the flowing ambient air $F_{AI}$ within the heat exchanger without physically mixing. The heater 152 is configured to heat the ambient air $F_{AI}$ before flowing over the MOF 142. In an embodiment, the heater 152 is configured to heat the ambient air $F_{AI}$ to a temperature at or above 45°. In an embodiment, the heater 152 is configured to heat the ambient air $F_{AI}$ to a temperature of 50-70° C. The heated ambient air then flows over the MOF 142. The heating by the heater 152 can increase the desorption rate of the $CO_2$ from the MOF 142 into the ambient air $F_{AI}$. In an embodiment, the MOF 142 can be fully regenerated (e.g., at least 95% of the adsorbed $CO_2$ desorbed, at least 98% of the adsorbed $CO_2$ desorbed) in less than 25 minutes using the heated ambient air.

The air (e.g., cooled air in the first mode, ambient air in the second mode) contacts the MOF 142 as it flows over the MOF 142. Air may flow over the MOF 142 by passing along an outer surface of the MOF 142 and/or by flowing through the MOF 142. For example, air may flow through the MOF 142 by flowing through a substrate on which the MOF 142 is disposed, by flowing through a MOF composition containing the MOF 142 (e.g., a MOF composition including MOF and a binder), or the like.

The $CO_2$ scrubber 140 is configured to adsorb $CO_2$ without adding ambient air to the enclosed space 104. Thus, $CO_2$ scrubber 140 can remove $CO_2$ without significantly increasing the concentration of oxygen $C_3$ in the enclosed space 104. For example, the $CO_2$ scrubber 140 is configured to not mix the ambient air and the indoor air (e.g., cooled air from the evaporator) during operation. The MTRS 120 is configured to decrease the $CO_2$ concentration $C_1$ within the enclosed space 104 (i.e., using the $CO_2$ scrubber) without adding ambient air from the ambient environment 170 to the enclosed space 104.

The MTRS 120 can also be configured to condition the enclosed space 104 so that oxygen concentration $C_3$ of the enclosed space 104 is at or above a predetermined minimum. In an embodiment, the predetermined minimum for the oxygen concentration may be a predetermined minimum that is based on the type of produce 106 being transported.

In an embodiment, the controller 190 may be configured to determine the type of produce 106 being transported (e.g., through user input, identification on the produce, or the like), and then use a predetermined minimum that corresponds to the type of produce 106 being transported. In an embodiment, the predetermined minimum may at or about 1 vol % of oxygen for the air in the enclosed space 104. In an embodiment, the predetermined minimum may be at or about 2 vol % of oxygen for the air in the enclosed space 104. In an embodiment, the predetermined minimum may be at or about 10 vol % of oxygen for the air in the enclosed space 104. In an embodiment, the MTRS 120 can also be configured to maintain the oxygen vol % of oxygen for the air in the enclosed space 104 below a predetermined maximum concentration (e.g., at or below atmospheric, at or below 21 vol % of oxygen).

In an embodiment, the MTRS 120 is configured to supply ambient air into the enclosed space 104 to adjust the oxygen concentration $C_3$ of the air within the enclosed space 104 (e.g., to increase the oxygen concentration $C_3$ of the air within the enclosed space 104). Supplying ambient air into the enclosed space 104 can increase the oxygen concentration $C_3$ of the air within the enclosed space 104. The MTRS 120 supplies ambient air into the enclosed space based on the oxygen concentration of the air within the enclosed space. to The MTRS 120 may include an ambient air inlet 116 for supplying the ambient air into the enclosed space 104. For example, the ambient air inlet 116 can be an actuatable vent or the like that can be actuated between open and closed. The MTRS 120 can operate the ambient air inlet 116 (i.e., open and close the ambient air inlet 116, turn on/off a fan in the ambient air inlet (not shown), or the like). When open, ambient air from the ambient environment 170 flows through the ambient air inlet 116 into the transport container 102. When closed, ambient air is blocked and does not flow through the ambient air inlet 116 into the transport container 102. As shown in FIG. 2, the ambient air inlet 116 is connected to the ventilation pathway 110 to allow for cooling of the air by the evaporator 124. In an embodiment, the ambient air inlet 116 may be configured to discharge directly into the enclosed space 104.

In FIGS. 3A and 3B, the $CO_2$ scrubber 140 is shown as only have a single compartment/cartridge of the MOF 142. However, in an embodiment, the $CO_2$ scrubber 140 may include multiple cartridges of the MOF 142. In such an embodiment, the $CO_2$ scrubber may be configured to operate the cartridges in different modes during operation. For example, the $CO_2$ scrubber operates a first cartridge of the MOF 142 in the first mode (e.g., the MOF 142 in the first cartridge contacting and adsorbing $CO_2$ from the cooled air $F_{CA}$) while operating a second cartridge of the MOF 142 in the second mode (e.g., the MOF 142 in the second cartridge contacting the ambient air $F_{AI}$ and desorbing the adsorbed $CO_2$ into the ambient air $F_{AI}$). The $CO_2$ scrubber may then operate the second cartridge of the MOF 142 in the first mode while operating the first cartridge of the MOF 142 in the second mode. In such an embodiment, it should be appreciated that the $CO_2$ scrubber 140 can include valve(s)/duct(s)/blower(s) to direct the ambient air and cooled air to pass through their respective cartridge(s) without being mixed. This configuration can allow the $CO_2$ scrubber to continuously operate as at least one of the cartridges of MOF 142 is available to scrub the air.

The CO2 scrubber 140 includes the MOF 142. The MOF 142 includes metal ions, and/or clusters of metal ions, bound together with an organic linker (e.g., organic ligand, or the like). In an embodiment, the MOF 142 is a hydrophobic MOF. The MOF is configured to adsorb while having limited absorption other components from the air. For example, the MOF 142 is configured to adsorb less than 5 vol % of non-$CO_2$ components when at or about full $CO_2$ saturation. In an embodiment, the metal ions in the MOF 142 include potassium and cobalt and the organic linker is citrate linker. For example, the MOF 142 can be $K_2Co_3(cit)_2$, cit=$C_6H_4O_7$.

In an embodiment, the MOF 142 has a $CO_2$ adsorption capacity of at least 25 $cm^3$ STP/g (i.e., adsorbs 25 $cm^3$ of $CO_2$ at the standard pressure and temperature (STP) of 0° C. and 1 atm per gram of MOF), when adsorbing $CO_2$ from air containing 15 vol % of $CO_2$. In an embodiment, the MOF 142 has a $CO_2$ adsorption capacity of at least 30 $cm^3$ STP/g (i.e., adsorbs 30 $cm^3$ of $CO_2$ at the standard pressure and temperature (STP) of 0° C. and 1 atm per gram of MOF), when adsorbing $CO_2$ from air containing 15 vol % of $CO_2$. In an embodiment, the MOF 142 has a $CO_2$ adsorption capacity at least 35 $cm^3$ STP/g, when adsorbing $CO_2$ from air containing 15 vol % of $CO_2$. In an embodiment, the MOF 142 has a $CO_2$ adsorption capacity at least 40 $cm^3$ STP/g, when adsorbing $CO_2$ from air containing 15 vol % of $CO_2$.

The MOF 142 may be used in a variety of different forms. The MOF 142 can be applied as a MOF composition that includes the MOF and a binder. The MOF composition may be in the form of a coating, a pellet, or the like. In an embodiment, MOF composition is in the form of a coating applied to one or more solid and/or mesh surfaces (e.g., metal surfaces, plastic surfaces, mesh surfaces, etc.). For example, the coating may be applied to a structure having high surface area (e.g., a hollow honeycomb structure, a fluted structure, or the like) to have a maximum/large surface for adsorption. In an embodiment, the MOF composition in the form of pellets. In an embodiment, the pellets are formed to have a substantially spherical shape (e.g., having at least one of a spherical shape and a semi-spherical shape). In an embodiment, the pellets had an average width (e.g., average diameter) of 3-6 mm. 1 mm to 5 mm The pellets are made of a MOF composition that includes the MOF and a binder. The binder adheres the MOF to itself and into the pellet shape. The binder is configured to adhere the MOF while having a limited impact on the $CO_2$ adsorption capacity of the MOF. In an embodiment, the binder is configured to decrease the $CO_2$ adsorption capacity of the MOF by less than 15% (e.g., $CO_2$ adsorption capacity of the MOF composition ≥85% of $CO_2$ adsorption capacity of pure MOF). Adsorption capacity refers to the maximum amount of $CO_2$ (e.g., $cm^3/g$) that a material is capable of adsorbing.

In an embodiment, the binder in the MOF composition is polyvinyl butyral (PVB). For example, PVB has been found to have provide good adhesion/cohesion for the MOF while having a limited impact on its adsorption capacity. In an embodiment, the MOF composition contains 1-10 wt % of the binder. In an embodiment, the MOF composition contains 2-8 wt % of the binder. In an embodiment, the MOF composition contains 2-6 wt % of the binder. In an embodiment, the MOF composition contains 3-5 wt % of the binder. For example, in one embodiment, an MOF composition containing 4.1 wt % of PVB as the binder was found to provide high adhesion while only decreasing the $CO_2$ adsorption capacity of the MOF by about 11.6%. For example, in another embodiment, an MOF composition containing 2.0 wt % of PVB as binder provided adequate adhesion while only decreasing the $CO_2$ adsorption capacity of the MOF by about 1.5%.

Figure 4:
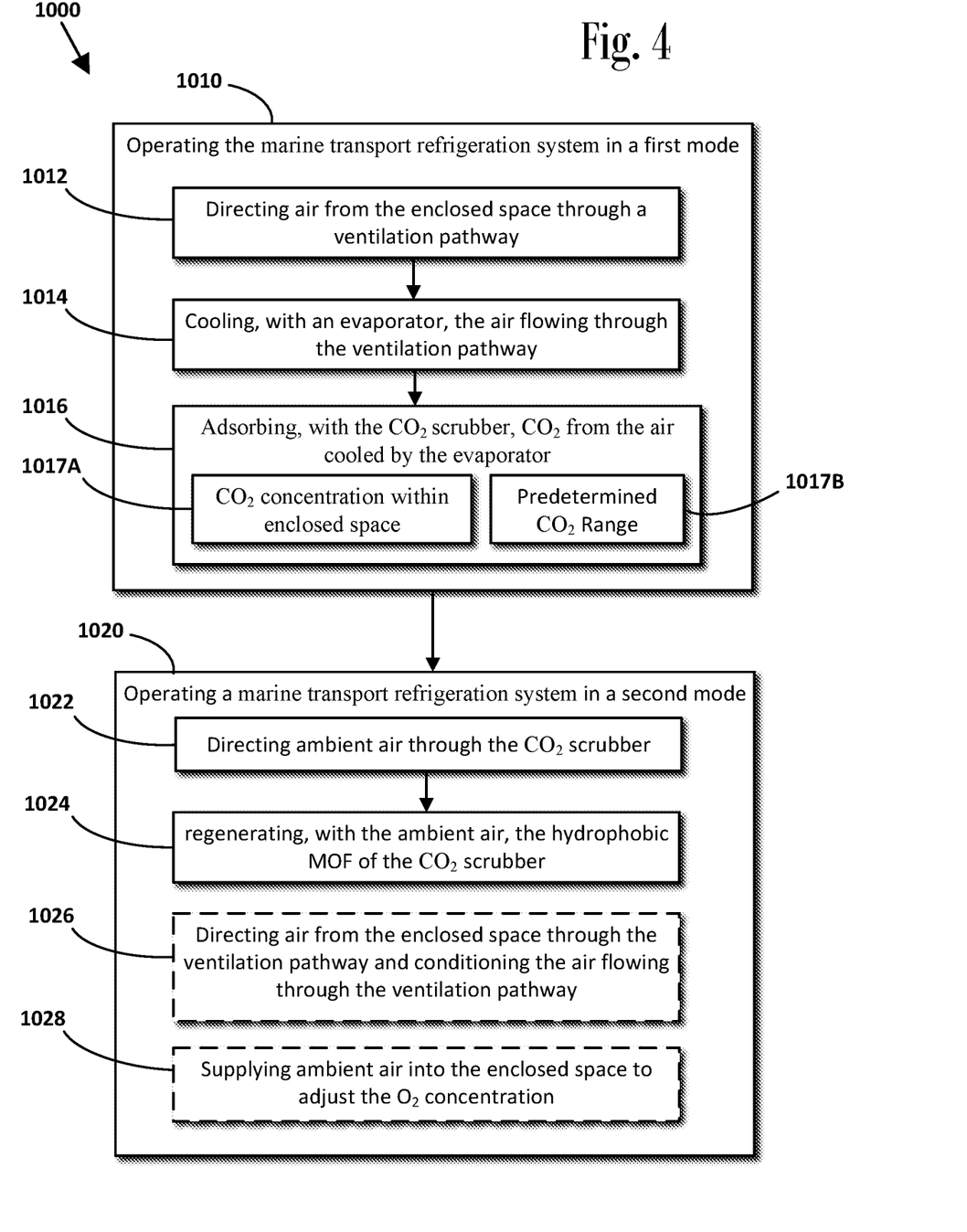
FIG. 4 is a block flow diagram of an embodiment of a method of conditioning an enclosed space of a marine transport unit.

FIG. 4 is a block flow diagram of a method 1000 of conditioning an enclosed space of a marine transport unit. In an embodiment, the method 1000 may be applied using the marine transport refrigeration system (MTRS) 120 of the marine transport unit 100 in FIG. 2. In an embodiment, the method 1000 may be employed using the MTRS 1 in FIG. 1. For example, the marine transport unit can include a marine transport refrigeration system (MTRS) (e.g., MTRS 120) that includes an evaporator (e.g., evaporator 40, evaporator 124) and a $CO_2$ scrubber (e.g., CO2 scrubber 140). the method 1000 may be carried out by a controller (e.g., controller 190) of the marine transport unit 100 to condition the enclosed space 104 the marine transport unit 100. The method 1000 begins at 1010.

At 1010, the MTRS is operated in a first mode. For example, the first mode is a cooling and $CO_2$ adsorption mode (e.g., as shown in FIGS. 2 and 3A) that is configured to cool and remove $CO_2$ from the air of the enclosed space (e.g., enclosed space 104). The MTRS in the first mode can be configured to discharged the conditioned air back into the enclosed at a temperature (e.g., temperature $T_2$) and a $CO_2$ concentration (e.g., $CO_2$ concentration $C_2$ of the air) such that the enclosed space is at a desired temperature point/range and a desired $CO_2$ concentration as discussed above. As shown in FIG. 4, operating the MTRS in the first mode includes 1012, 1014, and 1016.

At 1012, air from the enclosed space is directed through a ventilation pathway (e.g., ventilation pathway (e.g., ventilation pathway 110). The ventilation pathway including an inlet (e.g., inlet 112) and an outlet (e.g., outlet 114) connected to the enclosed space. Directing air from the enclosed space through a ventilation pathway at 1012 can include operating one or more fans (e.g., fan 126) to blow the air through the ventilation pathway. For example, operating the fan(s) can include operating each of the fan(s) at a speed based on the desired conditioning for the enclosed space.

At 1014, evaporator cools the air flowing through the ventilation pathway. Cooling that air at 1014 can include detecting a temperature of the enclosed space (e.g., temperature $T_1$) and operating the evaporator to provide an amount of cooling to the air based on the detected temperature of the enclosed space (e.g., so that the enclosed space is conditioned to a desired temperature/range). For example, this can include operating a refrigerant circuit of the evaporator (e.g., refrigerant circuit 5, refrigerant circuit 122) so that the refrigerant flowing through the evaporator provides said amount of cooling to the air.

At 1016, the $CO_2$ scrubber adsorbs $CO_2$ from the air cooled by the evaporator. This can be referred to as operating the $CO_2$ scrubber in an adsorption mode. The $CO_2$ scrubber adsorbing $CO_2$ from the air cooled by the evaporator includes directing the cooled air discharged from the evaporator across a MOF (e.g., MOF 142) within the $CO_2$ scrubber and the MOF adsorbs the $CO_2$ from the air. In an embodiment, adsorbing $CO_2$ from the air with the $CO_2$ scrubber at 1016 can include adsorbing an amount of $CO_2$ from the air based on the concentration of $CO_2$ in the air the enclosed space 1017A (e.g., $CO_2$ concentration $C_1$) and a predetermined $CO_2$ concentration range for the air in the enclosed space 1017B (e.g., a predetermined desired $CO_2$ concentration range for the produce 106). In an embodiment, the $CO_2$ scrubber may be configured to adjust the amount of $CO_2$ adsorbed by MOF by exposing less of the MOF to the cooled air (e.g., less exposure to decreases the amount of amount of $CO_2$ adsorbed). For example, this may include by passing a portion of the cooled air around the MOF 142 (e.g., through by-pass 160). For example, this may include increasing a flow rate of the air through the scrubber (e.g., increasing speed of fan 126) such that the degree of contact between the cooled air and the MOF is decreased. In the first mode, the cooled and CO2 scrubbed air can then be discharged back into the enclosed space 104. The method 1000 then proceeds from 1010 to 1020.

At 1020, the MTRS is operated in a second mode. For example, the second mode is a regeneration mode for the MOF in the $CO_2$ scrubber. In an embodiment, the MTRS is configured to change from the first mode to the second mode when the MOF in the $CO_2$ scrubber is at a maximum $CO_2$ adsorption threshold (e.g., a predetermine saturation level, a predetermined saturation at or near maximum saturation). Operating the MTRS in the second mode 1020 includes 1022 and 1024.

At 1022, ambient air (e.g., ambient air FAT) is directed through the $CO_2$ scrubber. The ambient air is directed at 1022 to flow over the MOF used to adsorb $CO_2$ at 1016. The ambient air is directed through the $CO_2$ scrubber at 1022 without mixing with air flowing to and/or from the enclosed space (e.g., cooled air discharged from the evaporator). In an embodiment, directing the ambient air through the $CO_2$ scrubber at 1022 includes directing the ambient air from the ambient environment (e.g., ambient environment 170) to the $CO_2$ scrubber, directing the ambient air to flow over the MOF, and discharging the air after flowing over the MOF back into the ambient environment (e.g., ambient environment 170).

In an embodiment, directing the ambient air through the $CO_2$ scrubber at 1022 may include heating the ambient air with a heater (e.g., heater 152). The ambient air is heated before flowing over the MOF and the heated ambient air flows over the MOF. For example, ambient air is directed from the ambient environment through the heater, and then the heated ambient air is directed from the heater 152 to and over the MOF.

At 1024, the ambient air regenerates the MOF. The ambient air regenerates the MOF at 1024 by the adsorbed $CO_2$ in the MOF desorbing into the ambient air as it flows over the MOF. This can be referred to operating the $CO_2$ scrubber in regeneration mode. In an embodiment, heated ambient air flows over the MOF. The temperature increase of the ambient air can increase the rate at which the $CO_2$ in the MOF desorbs into the ambient air (e.g., increases the $CO_2$ desorption rate from the MOF).

In an embodiment, operating in the second mode 1020 may also optionally include 1026. At 1026, air from the enclosed space is directed through the ventilation pathway and the air is conditioned as it flows through the ventilation pathway. The air is directed through the ventilation pathway at 1026 without mixing with the ambient air being directed through the $CO_2$ scrubber at 1022. For example, in an embodiment, the air is directed through the ventilation pathway at 1026 by being by-passed around the $CO_2$ scrubber (e.g., through by-pass 160).

In an embodiment, the $CO_2$ scrubber may include multiple compartments/cartridges of the MOF as discussed above. For example, the ambient air is directed through a first cartridge of the MOF at 1022 and the air flowing through the ventilation pathway at 1026 may be directed through a second cartridge of the MOF such that the ambient air and the air from the enclosed space do not mix. In such an embodiment, operating in the first mode at 1010 may include directing ambient air through the second cartridge of the MOF to regenerate the MOF in the second cartridge similar to 1022 and 1024, except for a regenerating the second cartridge of the MOF.

In an embodiment, operating in the second mode 1020 may also optionally include 1028. At 1028, ambient air is supplied from the ambient environment into the enclosed space (e.g., ambient air through the ambient air inlet 116). The ambient air is supplied to the enclosed space at 1028 to decrease the concentration of oxygen (e.g., oxygen concentration $C_3$) within the enclosed space. The ambient air is not the ambient air directed and used to regenerate the MOF at 1022 and 1024 (e.g., thee ambient air supplied to the enclosed space at 1028 is fresh ambient air). In an embodiment, the ambient air may be supplied to the enclosed space 1028 through the ventilation pathway. The ambient air directed from the ambient environment into ventilation pathway, passed through the ventilation pathway, and then discharged (as conditioned/cooled ambient air) from the ventilation pathway in to the enclosed space. For example, in an embodiment, the ambient air is directed through the ventilation pathway at 1028 by being by-passed around the $CO_2$ scrubber (e.g., through by-pass 160). The supplying of the ambient air 1028 can include operating/actuating an ambient air inlet (e.g., ambient air inlet 116) to be open. The ambient air inlet is closed when air is being scrubbed by the CO2 scrubber at 1016 such that no ambient air is supplied into the enclosed space. For example, the first mode 1010 in which the $CO_2$ scrubber is operating in an adsorption mode is configured to not supply/add ambient air into the enclosed space.

It should be appreciated that the method 1000 in an embodiment may be modified based on the MTRS 1 as shown in FIG. 1, the transport unit 100 as shown in FIGS. 2 and 3, and/or the CO2 scrubber 140 as shown in FIGS. 2-3B and as discussed above.

The transport unit, the transport refrigeration system, and the operation of thereof are described above for a marine transport unit. It should be appreciated that the above concepts may be generally applied to transport units used for transporting produce such as to a different type of transport unit than a marine transport unit in other embodiments. For example, the transport unit in an embodiment may be a ground transport unit.

ASPECTS

Any of Aspects 1-13 may be combined with any of Aspects 14-22, and any of Aspects 14-18 may be combined with any of Aspects 19-22.

Aspect 1. A transport refrigeration system for a transport unit, the transport unit including an enclosed space for storing produce, a ventilation pathway having an inlet and an outlet each connected to the enclosed space of the transport unit, the ventilation pathway configured to direct air to flow from the enclosed space into the ventilation pathway via the inlet and out of the ventilation pathway through the outlet, and the transport refrigeration system comprising: a refrigerant circuit including a compressor, a condenser, an expander, and an evaporator fluidly connected, the evaporator disposed in the ventilation pathway and configured to cool air flowing through the ventilation pathway; and an $CO_2$ scrubber containing a metal organic framework (MOF) configured to adsorb $CO_2$, the $CO_2$ scrubber disposed in the ventilation pathway downstream of the evaporator, the $CO_2$ scrubber having: an adsorption mode in which the air flows over the MOF and the MOF adsorbs $CO_2$ from the air, and a regeneration mode in which ambient air flows over the MOF and the adsorbed $CO_2$ desorbs into the ambient air.

Aspect 2. The transport refrigeration system of Aspect 1, wherein the transport refrigeration system is configured to decrease a concentration of $CO_2$ in the enclosed space using the CO2 scrubber and without supplying ambient air into the enclosed space.

Aspect 3. The transport refrigeration system of either one of Aspects 1 and 2, wherein the transport refrigeration system is configured to adjust a concentration of oxygen in the enclosed space by supplying ambient air into the enclosed space.

Aspect 4. The transport refrigeration system of any one of Aspects 1-3, wherein the $CO_2$ scrubber is configured to maintain a concentration of the $CO_2$ in the enclosed space within a predetermined range.

Aspect 5. The transport refrigeration system of Aspect 4, wherein the predetermined range is at or above 5% by volume of the $CO_2$ and at or less than 15% by volume of the $CO_2$.

Aspect 6. The transport refrigeration system of either one of Aspects 4 and 5, wherein the predetermined range is based on a type of the produce.

Aspect 7. The transport refrigeration system of any one of Aspects 1-6, further comprising: a heater for heating the ambient air, wherein in the regeneration mode, the heater heats the ambient air prior to flowing over the MOF.

Aspect 8. The transport refrigeration system of any one of Aspects 1-7, wherein the MOF has a maximum $CO_2$ saturation, and the MOF is configured to desorb at least 90% of the maximum $CO_2$ saturation using the ambient air at a temperature at or below 70° C. degrees.

Aspect 9. The transport refrigeration system of any one of Aspects 1-8, wherein the MOF has a $CO_2$ adsorption capacity of at least 25 cm$^3$ STP of $CO_2$/gram of MOF at a $CO_2$ concentration of 15 vol %.

Aspect 10. The transport refrigeration system of any one of Aspects 1-9, wherein the $CO_2$ scrubber includes a MOF composition comprising the MOF and 1-10 wt % of binder.

Aspect 11. The transport refrigerant system of Aspect 10, wherein the binder is polyvinyl butyral.

Aspect 12. The transport refrigeration system of any one of Aspects 1-11, wherein the MOF in the $CO_2$ scrubber is in a form of one or more of pellets, a coating on a mesh, and a coating on a solid surface.

Aspect 13. The transport refrigeration system of any one of Aspects 1-12, wherein the transport refrigeration system is a marine transport refrigeration system and the transport unit is a marine transport unit.

Aspect 14. A transport unit comprising: an enclosed space for storing produce; a ventilation pathway having an inlet and an outlet each connected to the enclosed space of the transport unit, the ventilation pathway configured to direct air to flow from the enclosed space into the ventilation pathway via the inlet and out of the ventilation pathway through the outlet; a transport refrigeration system configured to condition the enclosed space, the transport refrigeration system including: a refrigerant circuit including a compressor, a condenser, an expander, and an evaporator fluidly connected, the evaporator disposed in the ventilation pathway and configured to cool the air flowing through the ventilation pathway, and an $CO_2$ scrubber disposed in the ventilation pathway downstream of the evaporator, the $CO_2$ scrubber containing a metal organic framework (MOF) configured to adsorb $CO_2$, the $CO_2$ scrubber configured to have: an adsorption mode that directs the air in the ventilation pathway to flow over the MOF, the MOF adsorbing $CO_2$ from the air, and a regeneration mode that directs ambient air to flow over the MOF, the $CO_2$ adsorbed in the MOF being desorbed into the ambient air.

Aspect 15. The transport unit of Aspect 14, wherein the transport refrigeration system is configured to decrease a concentration of $CO_2$ in the enclosed space using the $CO_2$ scrubber and without supplying ambient air into the enclosed space.

Aspect 16. The transport unit of either one of Aspects 14 and 15, wherein the $CO_2$ scrubber is configured to maintain a concentration of the $CO_2$ in the enclosed space within a predetermined range.

Aspect 17. The transport unit of any one of Aspects 14-16, wherein the MOF has a maximum $CO_2$ saturation, and the MOF is configured to desorb at least 90% of the maximum $CO_2$ saturation using the ambient air at a temperature at or below 70° C. degrees.

Aspect 18. The transport unit of any one of Aspects 14-17, wherein the MOF has a $CO_2$ adsorption capacity of at least 25 cm$^3$ STP of $CO_2$/gram at a $CO_2$ concentration of 15 vol %.

Aspect 19. A method of conditioning an enclosed space of a transport unit, the enclosed space for storing produce, the method comprising: operating a transport refrigeration system (TRS) in a first mode, the transport refrigeration circuit including a refrigerant circuit including a compressor, a condenser, an expander, and an evaporator fluidly connected, and an $CO_2$ scrubber containing a metal organic framework (MOF) configured to adsorb $CO_2$, wherein the operating of the TRS in the first mode includes: directing air from the enclosed space through a ventilation pathway, cooling, with the evaporator, the air flowing through the ventilation pathway, and adsorbing, by the MOF of the $CO_2$ scrubber, $CO_2$ from the air cooled by the evaporator; and operating the TRS in a second mode, which includes: directing ambient air through the $CO_2$ scrubber, and regenerating, with the ambient air, the MOF of the $CO_2$ scrubber, wherein the $CO_2$ adsorbed the MOF in the first mode is released into the ambient air in the second mode.

Aspect 20. The method of Aspect 19, wherein operating in the first mode includes the $CO_2$ scrubber operating in an adsorption mode, and operating in the second mode includes the $CO_2$ scrubber operating in a regeneration mode.

Aspect 21. The method of either one of Aspects 19 and 20, wherein the operating of the TRS in the first mode does not add ambient air into the enclosed space.

Aspect 22. The method of any one of Aspects 19-21, wherein the MOF has a $CO_2$ adsorption capacity of at least 25 cm$^3$ STP of $CO_2$/gram at a $CO_2$ concentration of 15 vol %.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A transport refrigeration system for a transport unit, the transport unit including an enclosed space for storing produce and a ventilation pathway having an inlet and an outlet each connected to the enclosed space of the transport unit, the ventilation pathway configured to direct air to flow from the enclosed space into the ventilation pathway via the inlet and out of the ventilation pathway through the outlet of the transport unit, the transport refrigeration system comprising:
- a refrigerant circuit including a compressor, a condenser, an expander, and an evaporator fluidly connected, the evaporator disposed in the ventilation pathway and configured to cool the air flowing through the ventilation pathway; and
- a $CO_2$ scrubber containing a metal organic framework (MOF) configured to adsorb $CO_2$, the $CO_2$ scrubber disposed in the ventilation pathway downstream of the evaporator, the $CO_2$ scrubber having:
  - an adsorption mode in which the air flows over the MOF and the MOF adsorbs $CO_2$ from the air, wherein the $CO_2$ scrubber is one or more of configured to be interchangeable and configured to adjust an amount of the $CO_2$ absorbed by the MOF by adjusting an exposure of the MOF to the air, and
  - a regeneration mode in which ambient air flows over the MOF and the adsorbed $CO_2$ desorbs into the ambient air.

2. The transport refrigeration system of claim 1, wherein the transport refrigeration system is configured to decrease a concentration of $CO_2$ in the enclosed space using the $CO_2$ scrubber and without supplying the ambient air into the enclosed space.

3. The transport refrigeration system of claim 2, further comprising:
- a controller for the transport refrigeration system, the controller configured to detect, via an oxygen concentration sensor, a concentration of oxygen in the enclosed space,
- wherein the controller is configured to control the transport refrigeration system to adjust the concentration of oxygen in the enclosed space to be above a predetermined minimum by supplying ambient air into the enclosed space.

4. The transport refrigeration system of claim 1, wherein the $CO_2$ scrubber is configured to maintain a concentration of the $CO_2$ in the enclosed space within a predetermined range.

5. The transport refrigeration system of claim 4, wherein the predetermined range is at or above 5% by volume of the $CO_2$ and at or less than 15% by volume of the $CO_2$.

6. The transport refrigeration system of claim 4, further comprising:
- a controller for the transport refrigeration system, the controller configured to determine a type of the produce stored in the transport unit, and the predetermined range is a predetermined range corresponding to the type of the produce stored in the transport refrigeration system.

7. The transport refrigeration system of claim 1, further comprising:
- a heater for heating the ambient air,
- wherein in the regeneration mode, the heater heats the ambient air prior to flowing over the MOF.

8. The transport refrigeration system of claim 1, wherein the MOF has a maximum $CO_2$ saturation, and the MOF is configured to desorb at least 90% of the maximum $CO_2$ saturation using the ambient air at a temperature at or below 70° C. degrees.

9. The transport refrigeration system of claim 1, wherein the MOF has a $CO_2$ adsorption capacity of at least 25 cm$^3$ STP of $CO_2$/gram of the MOF at a $CO_2$ concentration of 15 vol %.

10. The transport refrigeration system of claim 1, wherein the $CO_2$ scrubber includes a MOF composition comprising the MOF and 1-10 wt % of binder.

11. The transport refrigeration system of claim 10, wherein the binder is polyvinyl butyral.

12. The transport refrigeration system of claim 1, wherein the MOF in the $CO_2$ scrubber is in a form of one or more of pellets, a coating on a mesh, and a coating on a solid surface.

13. The transport refrigeration system of claim 1, wherein the transport refrigeration system is a marine transport refrigeration system and the transport unit is a marine transport unit.

14. A transport unit comprising:
- an enclosed space for storing produce;
- a ventilation pathway having an inlet and an outlet each connected to the enclosed space of the transport unit, the ventilation pathway configured to direct air to flow from the enclosed space into the ventilation pathway via the inlet and out of the ventilation pathway through the outlet; and
- a transport refrigeration system configured to condition the enclosed space, the transport refrigeration system including:
  - a refrigerant circuit including a compressor, a condenser, an expander, and an evaporator fluidly connected, the evaporator disposed in the ventilation pathway and configured to cool the air flowing through the ventilation pathway, and
  - a $CO_2$ scrubber disposed in the ventilation pathway downstream of the evaporator, the $CO_2$ scrubber containing a metal organic framework (MOF) configured to adsorb $CO_2$, wherein the $CO_2$ scrubber is one or more of configured to be interchangeable and configured to adjust an amount of the $CO_2$ absorbed by the MOF by adjusting an exposure of the MOF to the air, the $CO_2$ scrubber configured to have:
    - an adsorption mode that directs the air in the ventilation pathway to flow over the MOF, the MOF adsorbing $CO_2$ from the air, and
    - a regeneration mode that directs ambient air to flow over the MOF, the $CO_2$ adsorbed in the MOF being desorbed into the ambient air.

15. The transport unit of claim 14, wherein the transport refrigeration system is configured to decrease a concentration of $CO_2$ in the enclosed space using the $CO_2$ scrubber and without supplying the ambient air into the enclosed space.

16. The transport unit of claim 14, wherein the $CO_2$ scrubber is configured to maintain a concentration of the $CO_2$ in the enclosed space within a predetermined range.

17. The transport unit of claim 14, wherein the MOF has a maximum $CO_2$ saturation, and the MOF is configured to desorb at least 90% of the maximum $CO_2$ saturation using the ambient air at a temperature at or below 70° C. degrees.

18. A method of conditioning an enclosed space of a transport unit, the enclosed space for storing produce, the method comprising:
- operating a transport refrigeration system (TRS) in a first mode, the TRS including a refrigerant circuit including a compressor, a condenser, an expander, and an evaporator fluidly connected, and a $CO_2$ scrubber containing a metal organic framework (MOF) configured to adsorb $CO_2$, wherein the $CO_2$ scrubber is one or more of configured to be interchangeable and configured to adjust an amount of the $CO_2$ absorbed by the MOF by adjusting an exposure of the MOF to air, wherein the operating of the TRS in the first mode includes:
- directing the air from the enclosed space through a ventilation pathway,
- cooling, with the evaporator, the air flowing through the ventilation pathway, and
- adsorbing, by the MOF of the $CO_2$ scrubber, $CO_2$ from the air cooled by the evaporator; and operating the TRS in a second mode, which includes:
- directing ambient air through the $CO_2$ scrubber, and
- regenerating, with the ambient air, the MOF of the $CO_2$ scrubber, wherein the $CO_2$ adsorbed the MOF in the first mode is released into the ambient air in the second mode.

19. The method of claim 18, wherein the operating of the TRS in the first mode does not add the ambient air into the enclosed space.

20. The method of claim 18, wherein the MOF has a $CO_2$ adsorption capacity of at least 25 $cm^3$ STP of $CO_2$/gram at a $CO_2$ concentration of 15 vol %.

* * * * *